(12) United States Patent
Hempenius et al.

(10) Patent No.: US 9,854,779 B2
(45) Date of Patent: Jan. 2, 2018

(54) METHOD OF AND ARRANGEMENT FOR MANAGING A GROUP OF DAIRY ANIMALS

(71) Applicant: LELY PATENT N.V., Maassluis (NL)

(72) Inventors: Age Hempenius, Hardegarijp (NL); Sjors Meijers, Geertruidenberg (NL)

(73) Assignee: LELY PATENT N.V., Maassluis (NL)

( * ) Notice: Subject to any disclaimer, the term of this patent is extended or adjusted under 35 U.S.C. 154(b) by 538 days.

(21) Appl. No.: 14/217,511

(22) Filed: Mar. 18, 2014

(65) Prior Publication Data
US 2014/0338603 A1 Nov. 20, 2014

(30) Foreign Application Priority Data
Mar. 18, 2013 (NL) .................................. 2010470

(51) Int. Cl.
| | | |
|---|---|---|
| *A01J 5/007* | (2006.01) | |
| *A01J 5/00* | (2006.01) | |
| *A01J 5/017* | (2006.01) | |
| *A01K 1/12* | (2006.01) | |

(52) U.S. Cl.
CPC ............. *A01J 5/007* (2013.01); *A01J 5/0175* (2013.01); *A01K 1/12* (2013.01)

(58) Field of Classification Search
CPC A01J 5/007; A01J 5/017; A01J 5/0175; A01J 5/01; A01J 5/00; A01K 1/12
See application file for complete search history.

(56) References Cited

U.S. PATENT DOCUMENTS

| | | | | |
|---|---|---|---|---|
| 4,508,058 A | * | 4/1985 | Jakobson | ................ A01J 5/013 |
| | | | | 119/14.02 |
| 5,704,311 A | * | 1/1998 | van den Berg | ......... A01J 5/007 |
| | | | | 119/14.02 |

(Continued)

FOREIGN PATENT DOCUMENTS

| | | |
|---|---|---|
| EP | 0677243 A2 | 10/1995 |
| EP | 1264536 A1 | 12/2002 |

(Continued)

OTHER PUBLICATIONS

Earlier Search Report for NL2010470 issued on Dec. 20, 2013.

*Primary Examiner* — Leslie A Nicholson, III
*Assistant Examiner* — Kimberley S Wright
(74) *Attorney, Agent, or Firm* — Oblon, McClelland, Maier & Neustadt, L.L.P.

(57) ABSTRACT

Method of managing dairy animals in a free housing including a voluntary automatic milking system, and including determining TLM as the time since the last milking of an animal, determining AVMF as an average daily voluntary milking frequency for the animal, setting a desired milking interval DMI for the animal, marking the animal for manual collection if TLM and/or DMI fulfill a collecting criterion, making a list of marked animals, collecting and milking the marked animals, wherein the collecting criterion is fulfilled if TLM is above a first interval threshold, or if TLM is at least equal to the value of a mathematical function applied to the DMI, or if AVMF is below a frequency threshold, and TLM is above a second, shorter interval threshold MRI. Also a milking arrangement is disclosed with a milking robot having a control device arranged to perform the method.

3 Claims, 2 Drawing Sheets

(56) References Cited

U.S. PATENT DOCUMENTS

| | | | | |
|---|---|---|---|---|
| 5,771,837 A * | 6/1998 | van der Lely | ............ | A01K 1/12 119/14.02 |
| 6,050,219 A * | 4/2000 | van der Lely | ........ | A01J 5/0175 119/14.04 |
| 6,148,766 A * | 11/2000 | van der Lely | ........ | A01J 5/0175 119/14.01 |
| 6,209,485 B1 * | 4/2001 | van der Lely | ........ | A01J 5/0175 119/14.02 |
| 6,516,744 B1 * | 2/2003 | Bjork | ................. | A01K 1/0023 119/14.02 |
| 6,520,112 B2 * | 2/2003 | van der Lely | ........ | A01J 5/0175 119/14.02 |
| 6,571,730 B1 * | 6/2003 | Norberg | ................ | A01J 5/0175 119/14.03 |
| 6,651,583 B1 * | 11/2003 | Lind | ....................... | A01J 5/007 119/14.02 |
| 8,087,382 B2 * | 1/2012 | Sundborger | ............ | A01J 5/007 119/14.02 |
| 8,256,376 B2 * | 9/2012 | Borsen | ..................... | A01K 1/12 119/14.02 |
| 8,746,175 B2 * | 6/2014 | Andre | ..................... | A01J 5/007 119/14.02 |
| 8,903,129 B2 * | 12/2014 | Hofman | ................ | G06T 7/0042 382/103 |
| 9,016,237 B2 * | 4/2015 | Van Den Berg | ..... | A01K 1/0023 119/14.08 |
| 9,095,114 B2 * | 8/2015 | Van Der Tol | ......... | A01J 5/007 |
| 9,179,639 B2 * | 11/2015 | Van De Walle | ......... | A01K 1/12 |
| 2002/0152962 A1 * | 10/2002 | Fransen | ................... | A01J 7/022 119/14.01 |
| 2003/0226508 A1 * | 12/2003 | Theelen | .................. | A01J 5/007 119/14.02 |
| 2004/0025792 A1 * | 2/2004 | Sjolund | ..................... | A01J 5/01 119/14.02 |
| 2010/0116211 A1 * | 5/2010 | Sundborger | ............ | A01J 5/007 119/14.02 |
| 2010/0170445 A1 * | 7/2010 | Gerrit | ..................... | A01J 5/007 119/14.02 |
| 2010/0236486 A1 * | 9/2010 | Petersen | .................. | A01K 1/00 119/14.03 |
| 2011/0232576 A1 * | 9/2011 | Van Der Tol | ........... | A01J 5/007 119/14.02 |
| 2011/0239944 A1 * | 10/2011 | Huls | ....................... | A01J 5/007 119/14.02 |
| 2012/0097107 A1 * | 4/2012 | Torgerson | ............... | A01J 5/007 119/14.02 |
| 2012/0111274 A1 * | 5/2012 | Kortekaas | ............... | A01J 5/007 119/14.02 |
| 2012/0125261 A1 * | 5/2012 | Van Den Berg | ..... | A01K 1/0023 119/14.02 |
| 2012/0125262 A1 * | 5/2012 | Van Der Tol | ........... | A01J 5/007 119/14.14 |
| 2013/0025540 A1 * | 1/2013 | Axelson | ................ | A01J 5/0132 119/14.02 |
| 2013/0098295 A1 * | 4/2013 | Mulder | .................... | A01J 5/007 119/14.02 |
| 2013/0167775 A1 * | 7/2013 | Van De Walle | ......... | A01K 1/12 119/14.02 |
| 2013/0199449 A1 * | 8/2013 | Daniel | .................... | A01J 5/007 119/14.02 |
| 2013/0239897 A1 * | 9/2013 | Birk | ....................... | A01J 5/0175 119/14.04 |
| 2013/0263787 A1 * | 10/2013 | Nyberg | ................ | A01K 29/005 119/14.03 |
| 2013/0284098 A1 * | 10/2013 | Eineren | ................ | A01J 5/007 119/14.08 |
| 2014/0311412 A1 * | 10/2014 | Hempenius | ............ | A01J 5/007 119/14.02 |
| 2015/0020738 A1 * | 1/2015 | Krone | ................... | A01J 5/0175 119/14.04 |
| 2015/0201576 A1 * | 7/2015 | Van Den Berg | ..... | A01K 1/0023 119/14.02 |
| 2015/0223425 A1 * | 8/2015 | Kortekaas | ............... | A01J 5/007 119/14.02 |
| 2015/0289486 A1 * | 10/2015 | Van Der Tol | ........... | A01J 5/007 119/14.14 |

FOREIGN PATENT DOCUMENTS

| | | | | |
|---|---|---|---|---|
| EP | 1369030 A2 | 12/2003 | | |
| EP | 2213161 A2 | 8/2010 | | |
| NL | WO 2011014063 A1 * | 2/2011 | ............. | A01J 5/007 |
| NZ | WO 2012005673 A1 * | 1/2012 | ............. | A01J 5/007 |
| WO | 2009002258 A1 | 12/2008 | | |

\* cited by examiner

METHOD OF AND ARRANGEMENT FOR MANAGING A GROUP OF DAIRY ANIMALS

CROSS REFERENCE TO RELATED APPLICATIONS

This application claims priority from Netherlands application number 2010470 filed on 18 Mar. 2013, which is hereby incorporated by reference in its entirety.

BACKGROUND OF THE INVENTION

1. Field of the Invention

The invention relates to a method of managing a group of dairy animals as well as a milking arrangement therefor.

2. Description of the Related Art

In voluntary milking systems, it sometimes happens that an animal does not go to the automatic milking system by itself within its planned milking interval. This could be for various reasons, such as lameness or other difficulty walking, having strayed very far from the system when grazing, or simply not feeling like being milked because of e.g. painful teats. However, prolonged milking intervals may lead to a reduced milk production, as too much milk in the udder may lead to resorption of milk and suppression of milk secretion. Therefore, such prolonged milking intervals are undesirable. Therefore, the dairy farmer will try to prevent such prolonged milking intervals, in particular by collecting the delayed animals and ensuring that they are milked in the system. Thereto, he will put together a list of animals to be fetched, and fetch those animals, most often twice a day.

This fetching and controlled milking means a lot of work for the dairy farmer. Thus, it is desirable, and an object of the present invention, to provide a method of managing the group of animals such that prolonged milking intervals are avoided on average, thus ensuring an enduring and high milk production, but with a minimum of labor for the dairy farmer.

BRIEF SUMMARY OF THE INVENTION

This object is achieved in the present invention by providing a method of managing a group of dairy animals in an animal housing in which the animals are allowed to move around freely, the housing comprising a voluntary automatic milking system, the method comprising determining for at least one, and preferably each, of said animals a first value TLM as the time since the last milking of said animal, determining a second value AVMF as an average daily voluntary milking frequency for said animal, setting a desired milking interval DMI for said animal, marking said animal for manual collection if the at least one of TLM and AVMF fulfil a collecting criterion, making a list of all animals of the group which are thus marked, collecting said marked animals, and milking said collected animals, wherein said collecting criterion is fulfilled if TLM is above a first interval threshold, or if TLM is at least equal to the value of a mathematical function applied to said DMI, the function providing a value that is larger than DMI, or if AVMF is below a frequency threshold and TLM is above a second interval threshold MRI (milked recently interval), that is shorter than the first interval threshold and shorter than said desired milking interval. The inventors have found that using such a method, with such a criterion, allows efficient milking with good sustained milk production and not too much labor for the dairy farmer. In particular, with the present method, it is possible to be more flexible with animals that come to the milking system quite often per day, such that a few hours overdue, that represent a large percentage of the average milking interval, is not yet a cause for action, while animals with a low milking frequency, where a similar percentage would lead to overly long milking intervals, can still be marked for collection. Further details of the invention will be elaborated on herein below.

More in particular, in a first aspect, the invention relates to a method of managing a group of dairy animals in an animal housing in which the animals are allowed to move around freely, the housing comprising a voluntary automatic milking system, the method comprising determining for at least one, and preferably each, of said animals a first value TLM as the time since the last milking of said animal, determining a second value AVMF as an average daily voluntary milking frequency for said animal, setting a desired milking interval DMI for said animal, marking an animal for manual collection if it fulfills a collecting criterion, making a list of all animals of the group which are thus marked, collecting said marked animals, and milking said collected animals.

In an embodiment, a method is provided for managing a group of dairy animals in an animal housing in which the animals are allowed to move around freely, the housing comprising a voluntary automatic milking system, the method comprising:

determining for at least one of the animals a first value TLM as the time since the last milking of said animal, determining a second value AVMF as an average daily voluntary milking frequency for said animal, setting a desired milking interval DMI for said animal marking said animal for manual collection if at least one of TLM and DMI fulfill a collecting criterion, making a list of all animals of the group which are thus marked, collecting said marked animals, and milking said collected animals, wherein said collecting criterion is fulfilled:

if TLM is above a first interval threshold, or if TLM is equal to or greater than the value resulting from application of a mathematical function to said DMI, wherein the mathematical function provides a value that is greater than said DMI, or if AVMF is below a frequency threshold, and TLM is above a second interval threshold MRI, that is shorter than the first interval threshold and shorter than said DMI.

In another embodiment, determining AVMF is performed over a past time period of a predetermined duration.

In a further embodiment, the method further comprises updating the TLM values for the at least one animal after each milking of at least one animal.

In an embodiment, the frequency threshold is dependent on the time in lactation for said animal.

In another embodiment, the frequency threshold is more than 2 if the animal is from 0 to a first number of days in lactation and/or wherein said frequency threshold is less than 2 if the animal is more than a second number of days in lactation.

In an embodiment, said mathematical function comprises multiplying DMI by a predetermined factor.

In a further embodiment, the step of collecting and milking said animals is performed during a predetermined number of rounds per day, each round having a planned beginning and a planned end, and wherein the MRI is taken as at the most the shortest of the time periods between the end of a first round and the beginning of the subsequent round.

In a further embodiment of the invention, a milking arrangement is provided, comprising an animal housing for milking animals, in which the animals are allowed to move around freely, the housing comprising a voluntary automatic milking system that comprises a milking space reachable by animals in said animal housing and an automatic milking robot, further comprising a control device for controlling the milking robot arranged to perform the above method(s).

Herein, it is specifically and expressly noted that, although the quantities AVMF and DMI are called a frequency and an interval, respectively, the respective equivalent parameters "average voluntary milking interval" and "desired milking frequency" are included. In other words, these quantities are to be understood in each case as a frequency or its equivalent interval/time period.

Furthermore, if the TLM ("time since last milking") is above a first interval threshold, that is equal for all animals, it is always marked for collection and milking. This first interval relates to an interval that ensures as much as possible that the animals are milked a minimum number of times per day. Such minimum number may be chosen in many ways, but it is often equal to the number of times that the dairy farmer makes a round to collect and milk animals, i.e. 2 times per day in most cases, such as between about 7-8 am and between about 5-6 pm. The first interval threshold is then preferably selected in accordance with these collection times. Often, a number between about 12 and 15 hours is selected.

As soon as an animal is put on the list, that animal will be milked when it comes into the milking system, i.e. overruling any other admission or milking criteria. After all, marking an animal for milking when that animal would subsequently be refused by the milking system, because of other criteria, would not be advantageous. However, it makes sense to milk an animal that has presented itself (very) recently. Therefore, TLM should be above a second interval threshold MRI, the "milked recently interval". This interval may vary per animal, such as a percentage of the desired milking interval DMI.

According to the invention, if the TLM is at least equal to, i.e. is equal to or larger than, the value of a mathematical function applied to the DMI, wherein the function provides a value that is larger than DMI, the collecting criterion is also fulfilled. This allows to apply, in addition to the general, all-animals-alike sub-criterion, also an animal specific criterion, in dependence of the DMI. An example could be to add a fixed time interval to the DMI, such as two hours. In other words, if the animal is two or more hours too late, the animal will be fetched (collected) and milked.

In embodiments, said mathematical function comprises multiplying DMI by a predetermined factor, in particular between 1.5 and 2.5, more in particular between 1.6 and 2.0. This uses the circumstance that milk production is a generally linear function of time. Since production determines whether an udder is too full, it is advantageous if the criterion's threshold is also linear, i.e. comprises (only) a multiplication. In a somewhat more sophisticated method, use is made of the fact that an animal will need not be admitted to the milking system only after the DMI has lapsed, but may also be admitted a short time before, such as after 85% or 90% of that interval. The latter interval (here, 85/90% of DMI) could be called the "allowed to be milked" interval, or AMI. Then, one may also multiply the AMI with said predetermined factor. However, it will be clear that this is still a multiplication, albeit with a different factor.

It is noted that multiplying the DMI with a factor could by itself also be used as the only criterion for fetching and milking. For example, multiplying by 1.2 could be used. In other words, if an animal is 20% overdue, it will be marked for collection and milking. However, as mentioned above, milking an animal that has recently been milked makes no sense, and therefore, in practice the animals are often allowed to be milked only a certain time after their last milking, or e.g. a after certain percentage of their DMI has lapsed, such as 70% or 80%. This means that for many animals, there is only a relatively short time window between being allowed to be milked and being put on the list for collecting and milking. For example, a cow's DMI of 9 hours leads to a window of less than 2 hours. Since cows generally don't wear alarm clocks, it is easy for them to "miss" their due time. Thus, they will be put on the list. However, it will be clear that simply waiting another hour or two would solve the matter by itself, without any harm for the cow or its milk production. The dairy farmer knows this too, and often, he will go through the list and yet remove animals on that list of which he thinks that there is no being-overdue problem. But this leads to extra work for the farmer, whereas he would like the system to mark just those animals for which it is relatively certain that they have to be fetched. Note that he cannot simply increase the multiplication factor to 1.6, say. This could lead to animals with a low milking frequency not showing up on the list because a DMI of say 10 hours would give a threshold time of 16 hours, which is longer than the time between two collecting rounds. Thus, it is clearly possible for the milking interval to become more than 24 hours. This is undesirable. However, with the present invention, such problems are prevented by applying a different or additional criterion to animals that would give prolonged collecting thresholds due to a too low DMI, or that show a too low average milking interval. Thereby, it becomes possible to increase the factor to a range where its effect as to decreasing the number of animals to be fetched becomes clearly visible.

In particular, animals that show a (very) low AVMF, such as lower than 2, are preferably always collected and milked, until they achieve a clearly higher (voluntary) milking frequency. Such animals could e.g. be animals that have to get used to the robot, are very early in lactation, are ill or the like. Thereto, a second interval threshold is used, called MRI or Milked Recently Interval, that ensures that these animals are (almost) always collected and milked, the only (often unlikely) exception being that the animal was milked in the past time period of length MRI. Of course, this MRI is taken to be (much) shorter than the first interval and also shorter than the DMI. The latter measure ensures that the animal will be milked even if it happened to be not yet due to be milked. After all, its AVMF indicated that the chance of it visiting the milking system in due time was relatively low. And in view of the time between the two collection rounds, adding such a time to the TLM would lead to a prolonged milking interval, that could lead to premature production decrease and also to the animal's discomfort. Therefore, unless it was milked too recently, i.e. within the last MRI, it is always milked, regardless of its DMI. Note that this MRI may be selected to be animal dependent, in particular in dependence of the number of days in lactation or their daily milk production. For example, the MRI could be made equal to the time in which the cow is expected to produce a fixed amount of milk, such as 2 liters. In particular, the step of collecting and milking said animals is performed during a predetermined number of rounds per day, in particular two, each round having a planned beginning and a planned end, and the MRI is taken as, at the most, the shortest of the time periods between the end of a first round for collecting and milking the animals and the beginning of the subsequent round. This ensures that the animal is milked at least two times per day, if it is only milked after collecting, or more, if voluntary milkings apply. For example, if two rounds each day are planned, one from 6-7 am and one from 5-6 pm, the MRI would be at the most 10 hours, although a shorter interval is not excluded, e.g. if a round would be delayed.

The animals may be helped to (re)achieve a desired milking frequency/interval by the collection and milking regime according to the invention. It may also relate to animals late in lactation, whose milk production has decreased so much that they no longer achieve (or actually need) the desired minimum milking frequency, and often times they hardly present themselves at the milking system. In the above, the average daily voluntary milking frequency for an animal should be corrected for milking after collecting. After all, the AVMF would seem to increase to two when the animal is always collected and milked, which would remove it from the list the next time. However, it is not a voluntary milking, and should in principle not be counted. On the other hand, if the animal does report to the milking station voluntarily, such visit could be added to the number of visits per day, indicating an increase in the AVMF. This holds in particular for those animals that are expected to show an increase in AVMF after some days, for example because their illness is being treated or because they are growing into lactation or getting used to the milking system. These animals may be transferred (or better: transfer themselves) to a normal regime wherein they do not need to be collected. Thereto, the AVMF is in principle the frequency during periods without collecting, i.e. the voluntary frequency. During collecting periods, the AVMF becomes at least 2, and special attention should be given to additional voluntary milkings, in particular for cows not too late in lactation. These can still increase in AVMF, while those late in lactation will probably not, and will stay at 2/day, even if there is an occasional voluntary milking.

Contrarily, animals in the last days of lactation will probably not leave the regime of collecting and milking until they are dried up. Still, the present invention allows their twice daily milking without interfering without a lot of unwanted additional work for the dairy farmer.

In embodiments, determining AVMF is performed over the past time period of a predetermined length, in particular at least 5 days, preferably at least 7 days. Thus, in these embodiments the AVMF is a running average. Although other time periods such as only three days, or even other ways of calculating the AVMF, such as a weighted average over the past time period, are not excluded, the above mentioned way of determining the AVMF has turned out to be a useful way.

In particular, the method comprises updating the values of TLM, and preferably also of AVMG, for the animal after each milking of said animal. In this way, the values are always up-to-date, and any management measures, such as the collecting and milking, or the stopping with such a regime, can be carried out at an early time.

Advantageously, the frequency threshold is dependent on the time in lactation for said animal. In this way, it can be taken into account how far the animal is in lactation. For example, animals that are very far in lactation, and in other words not too far from being dried up, are allowed to report themselves a lower number of times per day before being collected and milked than are animals not so far in lactation.

In some embodiments, said frequency threshold is more than 2 if the animal is from 0 to a first number of days in lactation. Alternatively or additionally, said frequency threshold is less than 2 if the animal is more than a second number of days in lactation, in particular said second number being equal to said first number. In this way, animals in the high-production part of the lactation will be collected and milked as soon as their AVMF decreases to a value that is still above the desired minimum of 2 for any animal, in order to help that animal through a period of lower visiting desire. The goal is here to restimulate the animal to visit the milking system voluntarily more often, which should be possible for that animal. On the other hand, if the animal has progressed along the decreasing part of the lactation curve, it is assumed that this restimulating is not the goal to be strived for, but, on the other hand, that the extra work of collecting and milking under the herdsman's control should not be invoked too soon. Thereto, a frequency threshold below 2 times per day can be selected. In a more sophisticated method, the frequency threshold for the "below 2/day" part is subdivided into two or more periods, each with its own threshold value, the threshold values decreasing with number of days in lactation. This reflects the general shape of the lactation curve.

The collecting of the marked animals can be done under a herdsman's control. However, it is also possible to collect the animals automatically, for example by means of an automatically movable robot that drives the animals towards the milking system, where there is a selection gate or the like, to separate the animals that are due to be milked (who may not pass the gate and/or the milking robot) and the animals that are not (who may pass).

The invention also relates to a milking arrangement, comprising an animal housing for milking animals, in which the animals are allowed to move around freely, the housing comprising a voluntary automatic milking system that comprises a milking space reachable by animals in said animal housing and an automatic milking robot, further comprising a control device for controlling the milking robot arranged to perform the method of the present invention. Such a milking arrangement will show the advantages as described for the method.

The automatic milking system may be any known system, such as the Lely Astronaut™ (Lely Enterprises, Maassluis, The Netherlands) or DeLaval VMS™ (DeLaval Holding AB, Tumba, Sweden). The system records the animals' ID and the times each animal is milked, and has a standard I/O-system for inputting e.g. the desired DMI and the various thresholds.

Further advantages, characteristics and properties of the invention will now be elucidated with reference to the following non-limiting exemplary embodiments, in which FIG. 1 shows a general view of a milking arrangement according to the invention.

In an example, a dairy cow farmer has two fetching rounds per day, one starting at 7 am, and one starting at 4 pm, each lasting about an hour. The MRI is set to 8 hours (=time between about 8 am and 4 pm).

The first interval threshold is set to 14 hours. Thus, each and every cow that has not been milked in the last 14 hours will be on the list of cows to be collected and milked. Furthermore, the mathematical function is "multiply by 1.8", and for the AVMF, the lactation-dependent frequency threshold is:

2.5/day, if the cow≤60 days in lactation,
1.6/day if the cow is from 60 to 200 days in lactation, and
1.4/day if the cow is more than 200 days in lactation.

The collecting criterion is thus fulfilled:
if TLM is above 14 hours,
if TLM≥(DMI*1.8), or
if AVMF<frequency threshold.

Suppose that cow 1 is 50 days in lactation, has a DMI of 6 hours, i.e. a desired milking frequency of 4 times a day, and has an AVMF of 2.1 times per day.

Thus, the collecting criterion is fulfilled, and it will be marked for collection and milking unless it was milked:
in the last 14 hours, i.e. the first alternative of collecting criterion,
in the last 10.8 hours (=6 hours*1.8), i.e. the second alternative of criterion, or
8 hours, AVMF below frequency threshold, so the third alternative of collecting criterion applies.

Thus, in all, it is the third alternative that overrides the other two, and the cow will be collected and milked unless it was milked in the past 8 hours, thus ensuring at least two milkings per day. Note that if the third alternative of the collecting criterion would not be used, there could be a problem for this cow. Assume that it would be milked during the morning fetching round, between 7 and 8 am. Then, at the afternoon fetching round after 8 hours, it would not yet be on the marked cows list, and it would not be milked. In the morning, at the next fetching round, 24 hours could have passed without milking. This is undesirable, and not unlikely in view of the low AVMF. Therefore, the third alternative of the criterion helps to prevent such situations. Of course, if the cow were to visit the milking system by itself on a regular basis, in particular during the period between the evening and the morning fetching round, the total AVMF could become higher than 2.5/day. Then, the animal could be left on its own, and follow only the first or second alternative of the collecting criterion. If all goes well, it has either recovered or "gets" the system. And if not, the collecting criterion is there to put it in the collecting regime again.

Cow 2 is 220 days in lactation, and has had an AVMF of 1.3/day during the last 7 days. This is below the frequency threshold, and also below the sometimes advised frequency of 2 times a day. Thus, according to the method of the invention, it will be collected and milked each fetching round, unless it happened to have been milked in an additional visit (unlikely). This will continue until e.g. its production has fallen below a predetermined limit, or it reaches the planned day for drying up.

Cow 3 is 100 days in lactation, and has a DMI of 6 hours, and an AVMF of 3.8/day during the last 7 days. At the morning fetching round, its TLM is 8 hours. Although this is still below 14 hours (first interval threshold), this is 33% overdue. In a stricter regime, to prevent prolonged milking intervals for animals with a long DMI of e.g. 10 hours, this would mean that cow 3 would be collected and milked. However, it will be clear that the chance is very great that cow 3 will present itself in due course for milking, without a too long time having passed. Now, according to the new method, it is possible to use a much larger overdue threshold, such as the 80% threshold used in this example, without causing the above mentioned prolonged milking intervals for animals with a lower AVMF. In particular, in the above example, cow 3 would have to have a TLM of 10.8 hours. This shows that with the present invention, the margin for cows such as these can be increased significantly without negative consequences for other cows.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
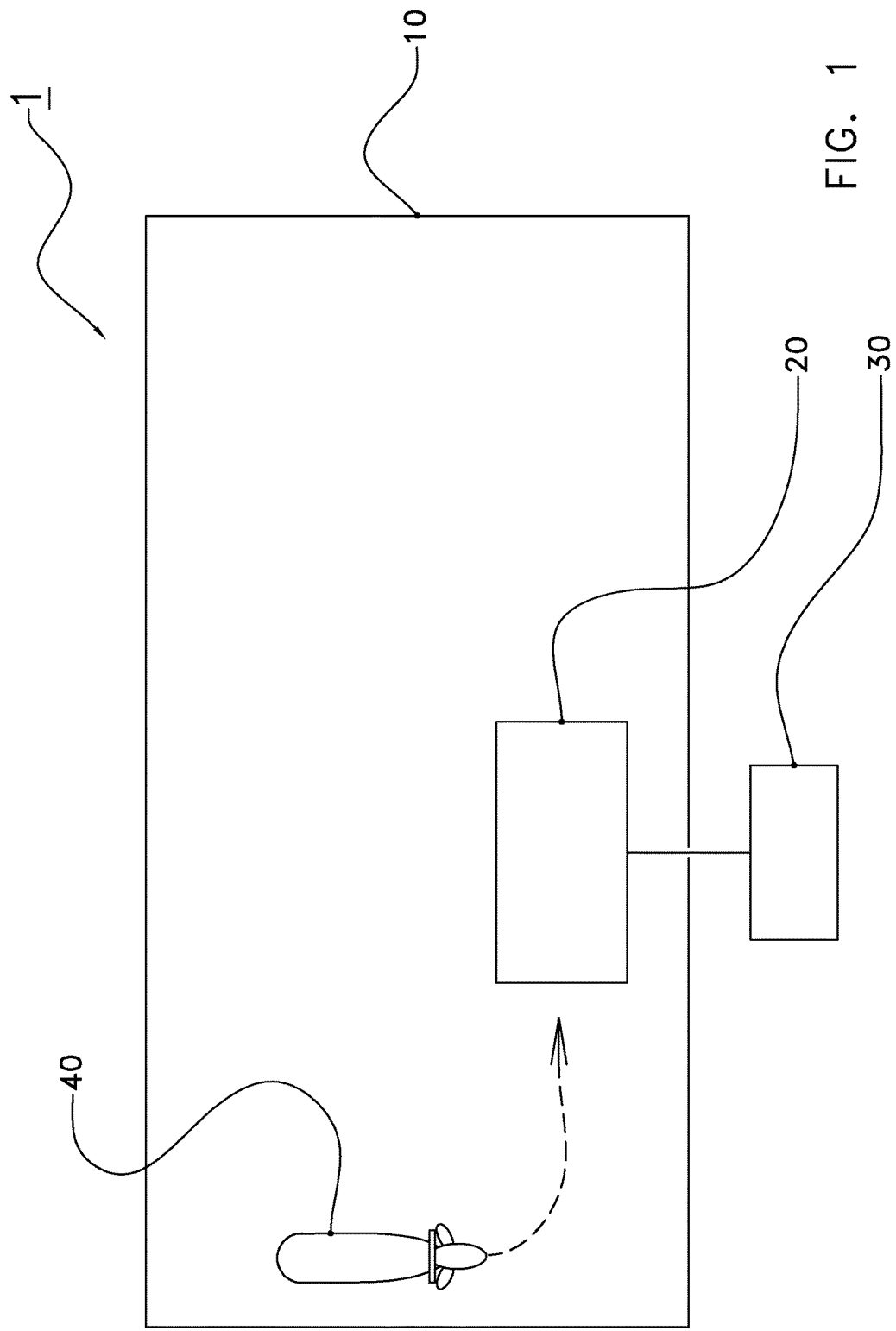
FIG. 1 shows a diagrammatic view of a milking arrangement according to the invention.

The following is a description of certain embodiments of the invention, given by way of example only and with reference to the drawings. FIG. 1 shows a general, diagrammatic view of a milking arrangement 1 according to the invention. The arrangement comprises a housing 10 in which animals, such as here a cow 40, may move about freely, as well as a milking robot 20 with a control device 30.

The control device 30 controls the milking robot 20, and more generally the milking arrangement 1. In the control device, a number of thresholds may be set, according to the invention, such as the threshold used in the example given above.

The cow 40 may go to the robot 20 and be milked if it is allowed to be milked, generally about the time of the desired milking interval DMI. If the animal 40 does not present herself for milking in due course, such that its time since last milking TLM fulfills the collecting criterion according to the invention, the control device 30 will put her on a list of cows to be collected and milked, e.g. under a herdsman's control. Then, the cow 40 will be collected during a fetching round, and milked in the robot 20, after which a new TLM starts to run. If the cow 40 does not present itself, it will stay in the regime in which it is collected and milked each fetching round. However, if the cow 40 is milked between fetching rounds, its average voluntary milking frequency may increase above the frequency threshold set according to the invention, allowing it to determine its milking times by itself.

It is repeated here that the present invention enables reduction of the number of cows to be put automatically on the list for collecting and milking.

Figure 2:
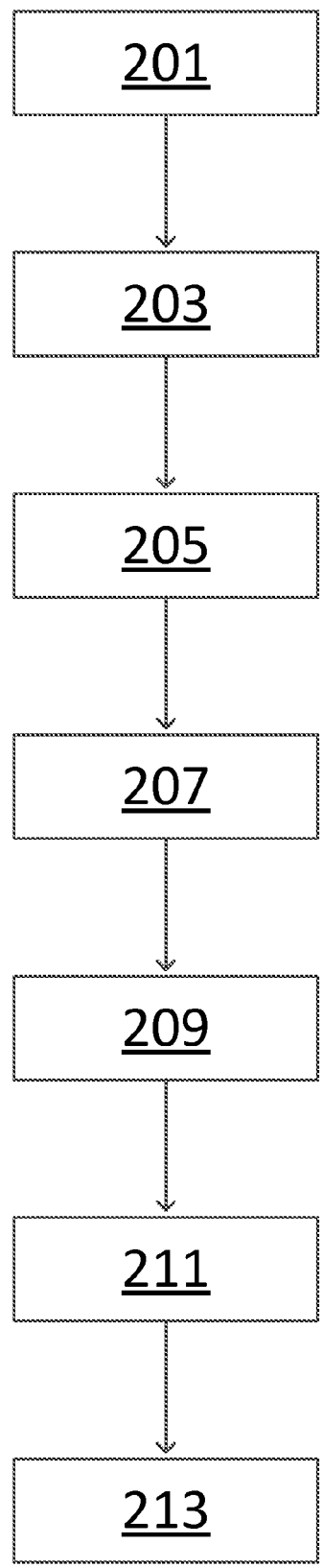
FIG. 2 shows a diagrammatic view of a method according to the invention.

FIG. 2 illustrates a method according to the invention. In a step 201, a first value TLM is determined as the time since the last milking of an animal. In a step 203, a second value AVMF is determined as an average daily voluntary milking frequency for said animal. In a step 205 a desired milking interval DMI is set for said animal. In step 207 said animal is marked for manual collection if at least one of TLM and DMI fulfill a collecting criterion. In step 209 a list is made of all animals of the group which are thus marked. In step 211 said marked animals are collected, and in step 213 the collected animals are milked. While the illustrated steps are shown connected by arrows, the arrows are not to be construed as limiting or defining the order of the steps, and the steps may be carried out in any desired or necessary order.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking arrangement, comprising:
an animal housing for milking animals, in which the animals are allowed to move around freely, the housing comprising a voluntary automatic milking system that comprises a milking space reachable by animals in said animal housing and an automatic milking robot; and a control device including particularly programmed processing circuitry configured to control the milking robot and to be configured to determine for at least one animal of the group of dairy animals a first value TLM as the time since the last milking of the at least one animal, determine a second value AVMF as an average daily voluntary milking frequency for said at least one animal, set a desired milking interval DMI for the at least one animal, mark the animal for collection if at least one of TLM and DMI fulfill a collecting criterion, wherein said collecting criterion is fulfilled if: TLM is above a first interval threshold, or TLM is equal to or greater than the value resulting from application of a calculation to said DMI, wherein the calculation provides a value that is greater than said DMI, or AVMF is below a frequency threshold, and TLM is above a second interval threshold MRI, that is shorter than the first interval threshold and shorter than said DMI, identify all animals of the group which are marked for collection, instruct collection of the marked animals, and instruct milking of the collected animals, wherein said calculation includes multiplying DMI by a predetermined factor.

2. A milking arrangement, comprising:

an animal housing for milking animals, in which the animals are allowed to move around freely, the housing comprising a voluntary automatic milking system that comprises a milking space reachable by animals in said animal housing and an automatic milking robot; and a control device including particularly programmed processing circuitry configured to control the milking robot and to be configured to determine for at least one animal of the group of dairy animals a first value TLM as the time since the last milking of the at least one animal, determine a second value AVMF as an average daily voluntary milking frequency for said at least one animal, set a desired milking interval DMI for the at least one animal, mark the animal for collection if at least one of TLM and DMI fulfill a collecting criterion, wherein said collecting criterion is fulfilled if: TLM is above a first interval threshold, or TLM is equal to or greater than the value resulting from application of a calculation to said DMI, wherein the calculation provides a value that is greater than said DMI, or AVMF is below a frequency threshold, and TLM is above a second interval threshold MRI, that is shorter than the first interval threshold and shorter than said DMI, identify all animals of the group which are marked for collection, instruct collection of the marked animals, and instruct milking of the collected animals, wherein said frequency threshold is dependent on the time in lactation for said animal, and wherein said frequency threshold is at least one of: more than 2 if the animal is from 0 to a first number of days in lactation, and wherein said frequency threshold is less than 2 if the animal is more than a second number of days in lactation.

3. A milking arrangement, comprising:

an animal housing for milking animals, in which the animals are allowed to move around freely, the housing comprising a voluntary automatic milking system that comprises a milking space reachable by animals in said animal housing and an automatic milking robot; and a control device including particularly programmed processing circuitry configured to control the milking robot and to be configured to determine for at least one animal of the group of dairy animals a first value TLM as the time since the last milking of the at least one animal, determine a second value AVMF as an average daily voluntary milking frequency for said at least one animal, set a desired milking interval DMI for the at least one animal, mark the animal for collection if at least one of TLM and DMI fulfill a collecting criterion, wherein said collecting criterion is fulfilled if: TLM is above a first interval threshold, or TLM is equal to or greater than the value resulting from application of a mathematical function to said DMI, wherein the mathematical function provides a value that is greater than said DMI, or AVMF is below a frequency threshold, and TLM is above a second interval threshold MRI, that is shorter than the first interval threshold and shorter than said DMI, identify all animals of the group which are marked for collection, instruct collection of the marked animals, instruct milking of the collected animals, update the TLM values for the at least one animal after each milking of said at least one animal, and update the AVMG values for the at least one animal after each milking of said at least one animal.

* * * * *